E. SEAVER.
Electric Battery.
No. 19,209.  Patented Jan. 26, 1858.
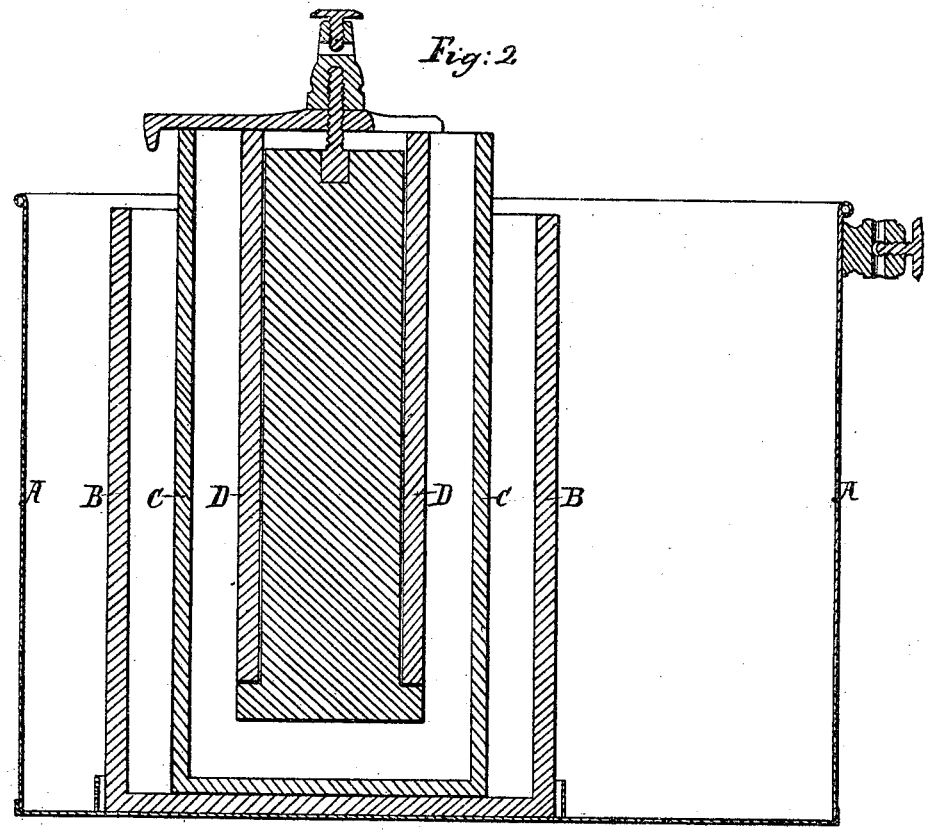
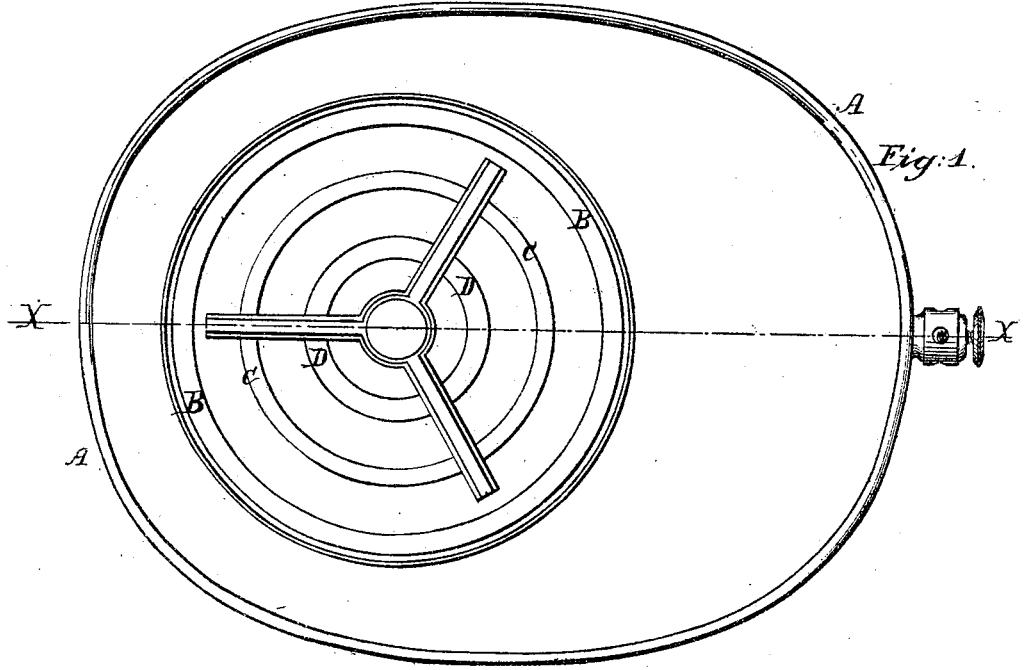

UNITED STATES PATENT OFFICE.

EBENEZER SEAVER, OF BOSTON, MASSACHUSETTS.

IMPROVED GALVANIC BATTERY.

Specification forming part of Letters Patent No. 19,209, dated January 26, 1858.

*To all whom it may concern:*

Be it known that I, EBENEZER SEAVER, of Boston, in the county of Suffolk and State of Massachusetts, have invented certain Improvements in Galvanic Batteries, of which the following is a full, clear, and exact description, reference being had to the annexed drawings, making part of this specification, in which—

Figure 1 is a plan; Fig. 2, a vertical section upon the line X X of Fig. 1.

In galvanic batteries where a solution of sulphate of copper is employed it is desirable that the solution be kept of a uniform strength; but the only way by which this can be effected in the batteries as now arranged is by suspending solid sulphate of copper in the solution, whereby the latter is kept constantly at the point of saturation. When such a solution is employed the action of the battery is more violent than is necessary, and the materials require to be frequently replenished. It is found, however, that a much weaker solution of the salt may be employed, provided a means were devised of maintaining the solution of a uniform strength.

To effect this end is the object of my present invention, which consists in interposing several thicknesses (two or more) of the porous material of which the ordinary cup is composed between the sulphate of copper and the zinc, whereby, with a saturated solution at one point, a uniform strength of a much lower degree may be maintained in contact with the outside of the cup containing the zinc.

To enable others skilled in the art to understand my invention, I will proceed to describe the manner in which I have carried it out.

In the said drawings, A is the tub or vessel containing the solution of sulphate of copper which is maintained at the point of saturation in any suitable manner.

B is a porous cup of a diameter sufficiently great to inclose the porous cup C, which contains the zinc D.

When the battery is set up the vessels A and B are filled with a saturated solution of sulphate of copper, and the vessel C with pure water. The solution within the cup B is soon reduced in strength, and recruits itself from the vessel A. The solution within the vessel A may thus be kept saturated, while that within the cup B will be weaker, the latter remaining, so long as the battery is in constant use, of a uniform strength, or very nearly so.

In the above description I have referred to but two porous cups, one within the other. I do not, however, limit myself to the employment of this number, as under certain circumstances a greater number may be employed.

What I claim as my invention, and desire to secure by Letters Patent as an improvement in galvanic bateries, is—

The employment of two or more porous cups, the one within the other, in the manner and for the purpose substantially as set forth.

EBENEZER SEAVER.

Witnesses:
ALBERT A. FOLSOM,
HENRY C. ALDEN.